United States Patent
Lok

(10) Patent No.: US 11,877,258 B1
(45) Date of Patent: Jan. 16, 2024

(54) AUTONOMOUS HUMAN TRAFFIC MONITORING

(71) Applicant: Aidan Lok, Howard Beach, NY (US)

(72) Inventor: Aidan Lok, Howard Beach, NY (US)

( * ) Notice: Subject to any disclaimer, the term of this patent is extended or adjusted under 35 U.S.C. 154(b) by 0 days.

(21) Appl. No.: 18/178,000

(22) Filed: Mar. 3, 2023

(51) Int. Cl.
*H04W 64/00* (2009.01)
*H04W 76/15* (2018.01)

(52) U.S. Cl.
CPC ......... *H04W 64/003* (2013.01); *H04W 76/15* (2018.02)

(58) Field of Classification Search
CPC .......................... H04W 64/003; H04W 76/15
See application file for complete search history.

(56) References Cited

U.S. PATENT DOCUMENTS

| 2014/0258443 A1* | 9/2014 | Stone ............... H04L 65/765 709/217 |
| 2016/0012097 A1* | 1/2016 | Lee ..................... G06F 16/25 707/690 |
| 2018/0189507 A1* | 7/2018 | Wakai ................. H04L 9/088 |

* cited by examiner

*Primary Examiner* — Justin Y Lee
(74) *Attorney, Agent, or Firm* — Miller IP Law

(57) ABSTRACT

Autonomous human traffic monitoring systems and methods are described herein. The autonomous human traffic monitoring system includes scanner nodes, a server node, a user device, and a user interface. The system can be configured to detect electronic transmissions from smart devices, receive commands and the data transmissions, process commands and data transmissions, store data, and send commands and data transmissions. The system collects data from smart devices in a coverage area and transits the data to a user device for processing to determine a count of persons in a coverage area over a specific period of time.

20 Claims, 8 Drawing Sheets

(Continued)

AUTONOMOUS HUMAN TRAFFIC MONITORING

BACKGROUND

Measuring human traffic in stores, buildings, venues, or other locations provides needed information for many purposes. One need for occupancy information is to comply with fire and safety protocols. Specifically, buildings and rooms within buildings can be zoned or rated for a maximum occupancy to allow for people to safely egress the room or building in an emergency. A further need for measuring human traffic or occupancy of a location is to measure the interest in location for marketing purposes.

BRIEF DESCRIPTION OF THE DRAWINGS

The present description will be understood more fully when viewed in conjunction with the accompanying drawings of various examples of autonomous human traffic monitoring. The description is not meant to limit the systems and methods to the specific examples. Rather, the specific examples depicted and described are provided for explanation and understanding of autonomous human traffic monitoring. Throughout the description, the drawings may be referred to as drawings, figures, and/or FIGS.

DETAILED DESCRIPTION

Figure 1:
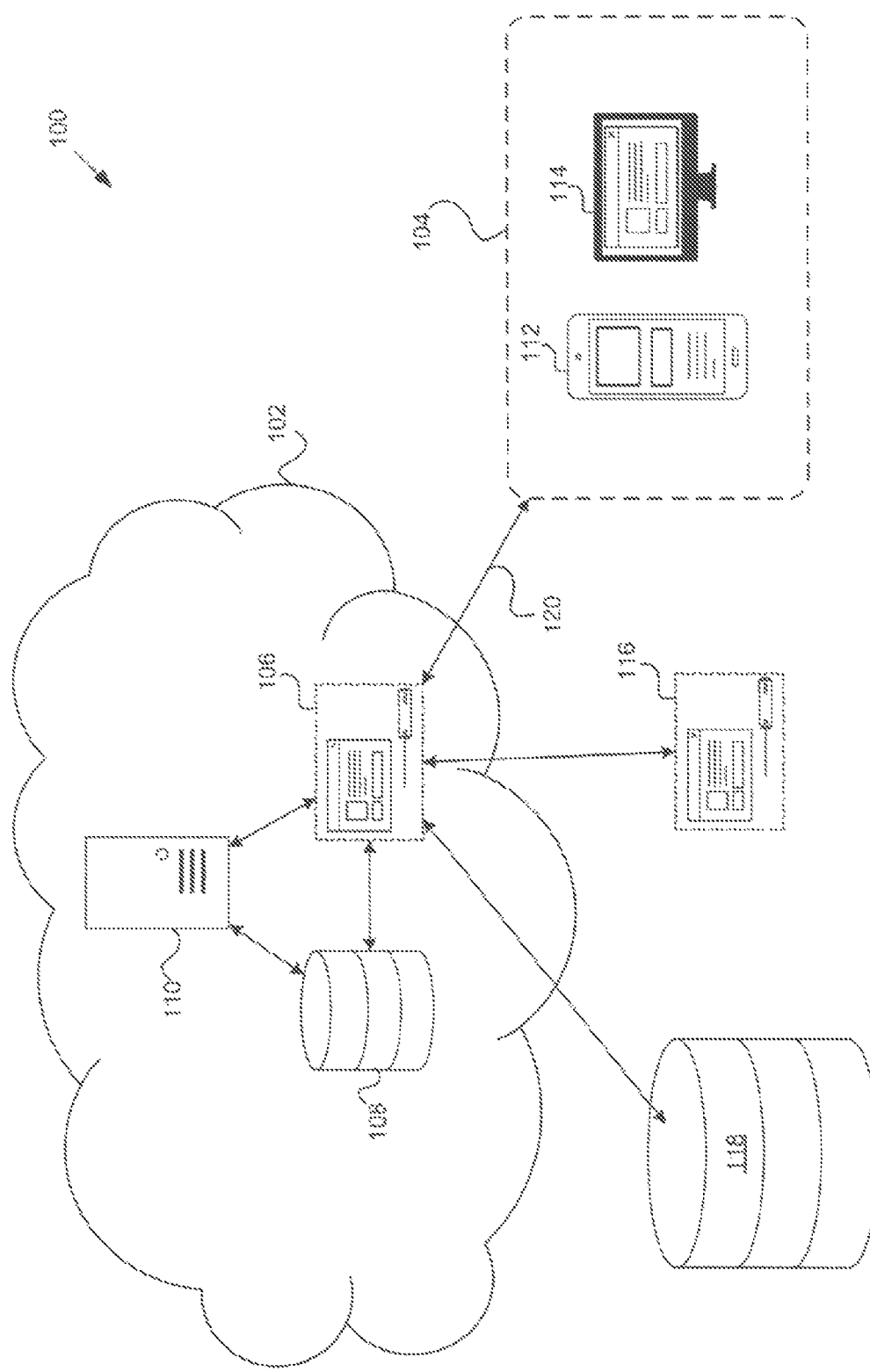
FIG. 1 illustrates an autonomous human traffic monitoring system, according to an embodiment.

Autonomous human traffic monitoring systems and methods as disclosed herein will become better understood through a review of the following detailed description in conjunction with the figures. The detailed description and figures provide merely examples of the various embodiments of artificial intelligence augmented customer relationship manager systems. Many variations are contemplated for different applications and design considerations; however, for the sake of brevity and clarity, all the contemplated variations may not be individually described in the following detailed description. Those skilled in the art will understand how the disclosed examples may be varied, modified, and altered and not depart in substance from the scope of the examples described herein.

The COVID-19 pandemic demonstrated the importance of tracking the number of people in location in real-time. The need to properly social distance required venues, restaurants, and stores to reduce their maximum occupancy and constantly monitor the total number of people in a given location. To ensure proper social distancing, necessary to reduce spreading contagious diseases, state, local and federal regulations were enforced on small and large businesses alike, with little regard to requirements of implementing the new occupancy requirements.

Separate from pandemic considerations, there are always requirements to regulate the number of people in a set or pre-defined area. Examples include maximum occupancy rules according to fire codes, which are often calculated based on the dimensions of a building and the number of exits. These rules are created to ensure that persons in the building are able to leave safely in the event of an emergency. Despite the critical nature of people counting, the methods that building administrators utilize to ensure that the capacity limit is followed are inefficient and/or expensive. Public safety can benefit from improvements in the efficiency and cost of the technology used to count people. Automated, accurate and efficient systems and methods are needed to provide detailed, real-time and accurate measurements of human traffic.

Conventional techniques employed for counting people in a building or location is to position a person, such as a store staff member, at an entrance with a counter. The staff member can keep a record of every person that walks into the store or location and stop individuals once the total number of persons reaches maximum occupancy. Unfortunately, entrances and exits are not always in the same location, and this can require additional staff members as well as a system to coordinate the number of people entering and exiting. One solution to these problems has been the use of radios or walkie-talkies to allow staff members to communicate with each other over long distances. This method is highly inefficient due to issuing including, human delay, miscounting, undercounting, double counting, and potential issues with communications.

Another conventional technique is to use optical cameras (such as visible light cameras) or thermal cameras at entrances and exits. The cameras can transmit the information to a central server where the data is processed in real-time to attempt to calculate the total number of people in an area at a given moment. While these camera-based systems can be an improvement over a human based system, for example, less labor intensive, and fewer human errors, they also possess deficiencies. The cameras require good lighting conditions and proper line-of-sight to capture accurate and usable pictures. For example, if an area to be monitored is dark, or a person is blocked by another person or object, the system can have inaccurate data. Line-of-sight issues can potentially be solved by additional cameras, but this adds additional costs, maintenance, and bandwidth requirements. Bandwidth requirements for transferring photos or relevant data in real-time can be more than 100 Megabits per second (e.g., with 10 cameras taking 10 frames per second). It is possible to take fewer photos per second, but that can result in an inaccurate count due to the system being unable to detect people moving quickly through the cameras' viewing area.

A network that operates on a camera-based system must be able to handle large amounts of real-time data. In addition, the artificial intelligence and/or machine learning programs required to process the photos in real time can be extremely expensive and require powerful computers to analyze data/photos in real-time. Known system for counting human traffic in stores and locations of interest have many deficiencies and drawbacks. Improvements are needed in the efficiency and cost of the technology used to count people.

Implementation of autonomous human traffic monitoring systems and methods may address the problems addressed above. Autonomous human traffic monitoring systems and methods can count Wi-Fi-enabled devices in an area of interest autonomously to approximate the number of people in a set or pre-defined area. Low-cost microcontrollers with integrated bearers, such as Wi-Fi and LoRa (long range, generally low data transmitters). A Wi-Fi network connection or Wi-Fi network interface can be established for communication between the scanner nodes, server nodes and/or smart user devices. A system and method including LoRa LPWAN (low power wide area network) can provide a system and method to count Wi-Fi-enabled devices via software that calculates the total amount of unique devices (or addresses) within a given area. This allows for a system and method that can autonomously calculate the total number of people in a coverage area at lower cost and greater ease than known methods.

The autonomous human traffic monitoring system can provide greater anonymity and privacy for persons in a public setting because of the lack of video or photo monitoring of individuals. The present system does not rely on video cameras or photography to monitor individuals, and therefore records less personal information.

The autonomous human traffic monitoring system can be used to monitor the number of persons in coverage area, such as a building, store, including measuring how long customers remain in a store, visit a particular area or section of a store, outside area for public safety, general data collection, e.g., measuring foot traffic on a bridge or public walkway to determine how much traffic results in wear and tear on the structure, marketing, and other areas where measuring human traffic can provide useful data. With regard to general data collection, the system can be employed to monitor the human traffic in a given area for civil engineering purposes, such as the number of pedestrians that enter and exit a public square, park, street, sidewalk, arena, or other potential coverage area to provide information on the required infrastructure for an area. Regarding marketing purposes, the system can be employed to monitor the human traffic in a store on a set day or days to see the effectiveness of sales promotions, new items, new store hours, providing new displays or sales in areas that have increased traffic, or traffic at specific times, or specific types of traffic. Special displays can apply to in-store displays as well as window displays. Regarding safety for contagious diseases or fire regulations there can often be set guidelines or regulations that must be monitored, or the store/building/area can be subject to fines, penalties, and possible closure.

The autonomous human traffic monitoring system can provide accurate and reliable information on the human traffic in a coverage area because of the mass use of Wi-Fi-enabled devices, particularly smart devices and smartphones. In modern times, nearly every adult, and often every child over the age of 10 possesses a smartphone. Additionally, devices without a cellular network plan, such as tablets and non-cellular enabled smartphones (often used by children) have active Wi-Fi radios. These devices all periodically send out a Wi-Fi beacon to announce their existence to nearby Wi-Fi networks. The autonomous human traffic monitoring systems and methods can use the built-in Wi-F The autonomous human traffic monitoring system can provide accurate and reliable information utilizes the existing features of smart devices by monitoring a given area for Wi-Fi probe packets transmitted from smart devices. The system and method further analyses each individual Wi-Fi probe pack to determine if the Wi-Fi probe packet comes from a unique Wi-Fi-enabled device. Autonomous human traffic monitoring systems and methods can alleviate many of the problems of conventional camera-based systems because it can detect devices anywhere within the Wi-Fi range, regardless of line-of-sight and/or lighting issues. Further, the autonomous human traffic monitoring systems and methods can utilize an out-of-band command and control mechanism that does not rely on the network infrastructure, resulting in significant cost savings. Moreover, the autonomous human traffic monitoring systems and methods are vastly more efficient, accurate, and less expensive than human based systems.

Implementations of autonomous human traffic monitoring system may address some or all of the problems described above. An autonomous human traffic monitoring system may include a low-cost implementation of a human-to-human short message private network using multi-bearer internet-of-things (IoT) microcontrollers to establish a fully decentralized mesh network transport mechanism.

Given the ubiquity, flexibility, and processing power of smartphones, and their ability to run software that is extendable with downloadable applications, they provide a versatile component of an autonomous human traffic monitoring system. Autonomous human traffic monitoring system as disclosed herein may augment a smartphone's communications capability, by obviating a shortcoming faced given a lack of working cellular towers using a series of nodes implementing low-power wide area networks (LPWANs). The LoRa commands, data transmissions, and/or messages are sent via long-range low-power wide area network connection operating via a network interface.

LPWANs may include a class of wireless physical layer network transceivers that have long range, low cost, and low power consumption, though may be limited by low data rates. Many LPWAN implementations may have ranges of 10-40 km in rural areas and 1-5 km in urban areas while limited to data rates of 27 kbps. LPWANs may include, inter alia, LoRa (Long Range), Sigfox, or NB-IoT.

LoRa may be an end-device to end-device technology that uses chirp spread spectrum encoding mechanisms to modulate the signal. The modulated signal may be resilient to noise and interference and is also very difficult to jam. LoRa may use the 900 MHz Industrial, Scientific and Medical (ISM) band in the United States, which is unlicensed spectrum and free to use. Thus LoRa may provide cost advantages over conventional systems.

System-on-a-chip (SoC) microcontroller technology may enable off-the-shelf multi-bearer IoT microcontrollers, which may meet the functionality requirement and desire for low cost to provide for a fully decentralized mesh network mechanism using LPWAN as a backhaul to achieve a large coverage area by treating each node as a repeater for a wireless physical layer (PHY) that can be designed for long range. Furthermore, each node's hardware may be self-contained and compact, using software edge caching to allow the autonomous human traffic monitoring system to be quickly and easily established over a large area.

A microcontroller having LoRa and Wi-Fi radios may be implemented as a system on chip (SoC), where all of the electronics needed for a network node are on an integrated circuit. Each node may include, for example, a PYCOM™ LoPy4 SoC board and LoRa antenna, which may be connected via a miniature radiofrequency (e.g., U.FL) connector to a coaxial (e.g., RP-SMA) cable, which can act as a stationary repeater node or handheld node carried by users. Microcontroller firmware may manage the autonomous human traffic monitoring system between the smartphone and the microcontroller, as well as between multiple instances of the microcontroller. The system may be effective in various environments, including indoor, urban, suburban, and rural environments. Experimental data demonstrated that the autonomous human traffic monitoring system can be used monitor human traffic at a low cost over a long range.

Such autonomous human traffic monitoring system may utilize standard, affordable smartphones. The autonomous human traffic monitoring system may include a software application running on the smartphones to provide a graphical user interface (GUI) to the end-users. The software application may be specifically designed to communicate between server nodes, scanner nodes and user smart devices. The system can be used to communicate with a mesh network established by a multitude of scanner nodes. Commands and/or data transmissions (messages) input to the software application GUI may be forwarded to all other nodes (scanner, server and/or smart user devices) on the network. The commands and/or data transmissions can include metadata and other content. The software application may then display any received commands, data transmissions, messages or processed data (including, metadata and other content) on the GUI. Thus, an end-to-end private network can be established using the invented approach.

The system can include two parts: a communication mechanism between the scanner nodes and the smart user device/server node, as well as a communication mechanism between scanner nodes. The communication mechanism between the scanner nodes and the smart user device/scanner node may be able to recognize different commands, data transmissions, and/or messages from the smart user device/server node and interpret these commands, data transmissions, and/or messages to perform specific tasks based on the command, data transmission, and/or message. The smart user device also must be able to command the scanner node communication mechanism to send specific commands, data transmissions, and/or messages over LoRa. The LoRa commands, data transmissions, and/or messages are sent via long-range low-power wide area network connection operating via a network interface.

The scanner nodes can include an inter-node communication system. The software can recognize messages and determine whether the message should not be forwarded again. A cache of all messages sent or received may be implemented to avoid broadcast storms. The inter-node communication mechanism in the scanner nodes may enable a LoRa mesh network having a total range as large as needed. Propagation delay may increase as the size of the network increases.

In an example embodiment of the microcontroller firmware, the microcontroller and the smartphone/server node may communicate over Wi-Fi. A hypertext transfer protocol (HTTP) web server may only respond to specifically formatted HTTP GET and POST transactions. The microcontroller may receive user messages from a smartphone/server node via HTTP POST transactions. The sender of the message, the timestamp of when the message was sent, as well as the body of the message (e.g., the message content) may be extracted from each HTTP POST request and stored in the microcontroller's memory. The list of all messages stored in the microcontroller's memory may be returned as a server response to all HTTP GET transactions.

The second component of the microcontroller firmware in the example embodiment may manage the LoRa system used to forward messages between scanner nodes. Messages received by the microcontroller from the user smart device/server node over HTTP POST may be transmitted via LoRa. The microcontroller firmware may utilize a first in first out (FIFO) queue of all LoRa messages. The list of messages (commands and/or data transmissions) stored in the microcontroller's memory in the FIFO queue may be used to exclude previously seen messages. If the message is new, the microcontroller may add the message to the FIFO queue and retransmit the message over LoRa to implement an SNCF mesh network architecture.

A smart device application, for use with the user smart device, can include two parts: a communication mechanism that allows the app to send messages to the server node and/or the scanner nodes, and allowing the app to collect commands, data transmissions and/or messages from server nodes and/or scanner nodes, and a GUI that displays received commands, data transmissions and/or messages and allows the end-user to input commands, data transmissions and/or messages for the app to send. The user smart device app may function over any wireless medium using any standard protocol, but HTTP may be implemented in various embodiments. The GUI may be on the user smart device. The GUI may have an internal data store that it uses to store and compare information that it has received from sever node and/or scanner nodes. The GUI may also instruct the server nodes and/or scanner nodes to gather information so that it can present new information to the user.

In the example embodiment, the user smart device application may be an HTTP client that can perform HTTP POSTs and HTTP GETs to send and receive commands, data transmissions and/or messages, respectively. The user smart device application can send an HTTP POST request to the microcontroller when the user sends commands, data transmissions and/or messages. The application may also send an HTTP GET request to the microcontroller every second to see if any new commands, data transmissions and/or messages have been received over LoRa. The user smart device app may compare the received commands, data transmissions and/or messages list against a local copy. New commands, data transmissions and/or messages may be added to the GUI if they are present in the received list but not the local copy.

In the example embodiment, the nodes may be designed to operate as either a smartphone/server node or as scanner nodes. The software may be identical for both modes of operation, though different subroutines may execute to produce the desired mode of operation.

The scanner nodes may include a battery, while the smartphone/server node version may draw power from the user smart device.

Each node (server node and/or scanner nodes) may include a multi-bearer radio array, which may be implemented as a LoRa-enabled SoC microcontroller. LoRa operates on Industrial Scientific Medical (ISM) Bands, which are unlicensed spectrum. Thus, the operation of LoRa on unlicensed spectrum allows a network to be deployed without the purchase of expensive licenses for spectrum.

In experimentation, five network nodes were built and arranged in varied environments to test the effectiveness of the network. The terrain was modified to find the effective range of any given pair of nodes in that specific environment. The four environments tested were indoor, urban, suburban, and rural. The different terrains tested affected the range of communication across the communications network. A Wi-Fi-only microcontroller without the LoRa radio subsystem served as a control.

FIG. 1 illustrates an autonomous human traffic monitoring system 100, according to an embodiment. The autonomous human traffic monitoring system 100 includes internal and external data resources for monitoring human traffic in a coverage area. The autonomous human traffic monitoring system 100 may result in reduced memory allocation at client devices and may conserve memory resources for application servers.

The autonomous human traffic monitoring system 100 may include a cloud-based data management system 102 and a user device 104. The cloud-based data management system 102 may include an application server 106, a database 108, and a data server 110. The user device 104 may include one or more devices associated with user profiles of the autonomous human traffic monitoring system 100, such as a smartphone 112 and/or a personal computer 114. The autonomous human traffic monitoring system 100 may include external resources such as an external application server 116 and/or an external database 118. The various elements of the autonomous human traffic monitoring system 100 may communicate via various communication links 120. An external resource may generally be considered a data resource owned and/or operated by an entity other than an entity that utilizes the cloud-based data management system 102 and/or the user device 104.

The autonomous human traffic monitoring system 100 may be web-based. The user device 104 may access the cloud-based data management system 102 via an online portal set up and/or managed by the application server 106. The autonomous human traffic monitoring system 100 may be implemented using a public internet. The autonomous human traffic monitoring system 100 may be implemented using a private intranet. Elements of the autonomous human traffic monitoring system 100, such as the database 108 and/or the data server 110, may be physically housed at a location remote from an entity that owns and/or operates the autonomous human traffic monitoring system 100. For example, various elements of the autonomous human traffic monitoring system 100 may be physically housed at a public service provider such as a web services provider. Elements of the autonomous human traffic monitoring system 100 may be physically housed at a private location, such as at a location occupied by the entity that owns and/or operates the autonomous human traffic monitoring system 100.

The communication links 120 may be direct or indirect. A direct link may include a link between two devices where information is communicated from one device to the other without passing through an intermediary. For example, the direct link may include a Bluetooth™ connection, a Zigbee R connection, a Wi-Fi Direct™ connection, a near-field communications (NFC) connection, an infrared connection, a wired universal serial bus (USB) connection, an ethernet cable connection, a fiber-optic connection, a firewire connection, a microwire connection, and so forth. In another example, the direct link may include a cable on a bus network. "Direct," when used regarding the communication links 120, may refer to any of the aforementioned direct communication links.

An indirect link may include a link between two or more devices where data may pass through an intermediary, such as a router, before being received by an intended recipient of the data. For example, the indirect link may include a Wi-Fi connection where data is passed through a Wi-Fi router, a cellular network connection where data is passed through a cellular network router, a wired network connection where devices are interconnected through hubs and/or routers, and so forth. The cellular network connection may be implemented according to one or more cellular network standards, including the global system for mobile communications (GSM) standard, a code division multiple access (CDMA) standard such as the universal mobile telecommunications standard, an orthogonal frequency division multiple access (OFDMA) standard such as the long term evolution (LTE) standard, and so forth. "Indirect," when used regarding the communication links 120, may refer to any of the aforementioned indirect communication links.

Figure 2:
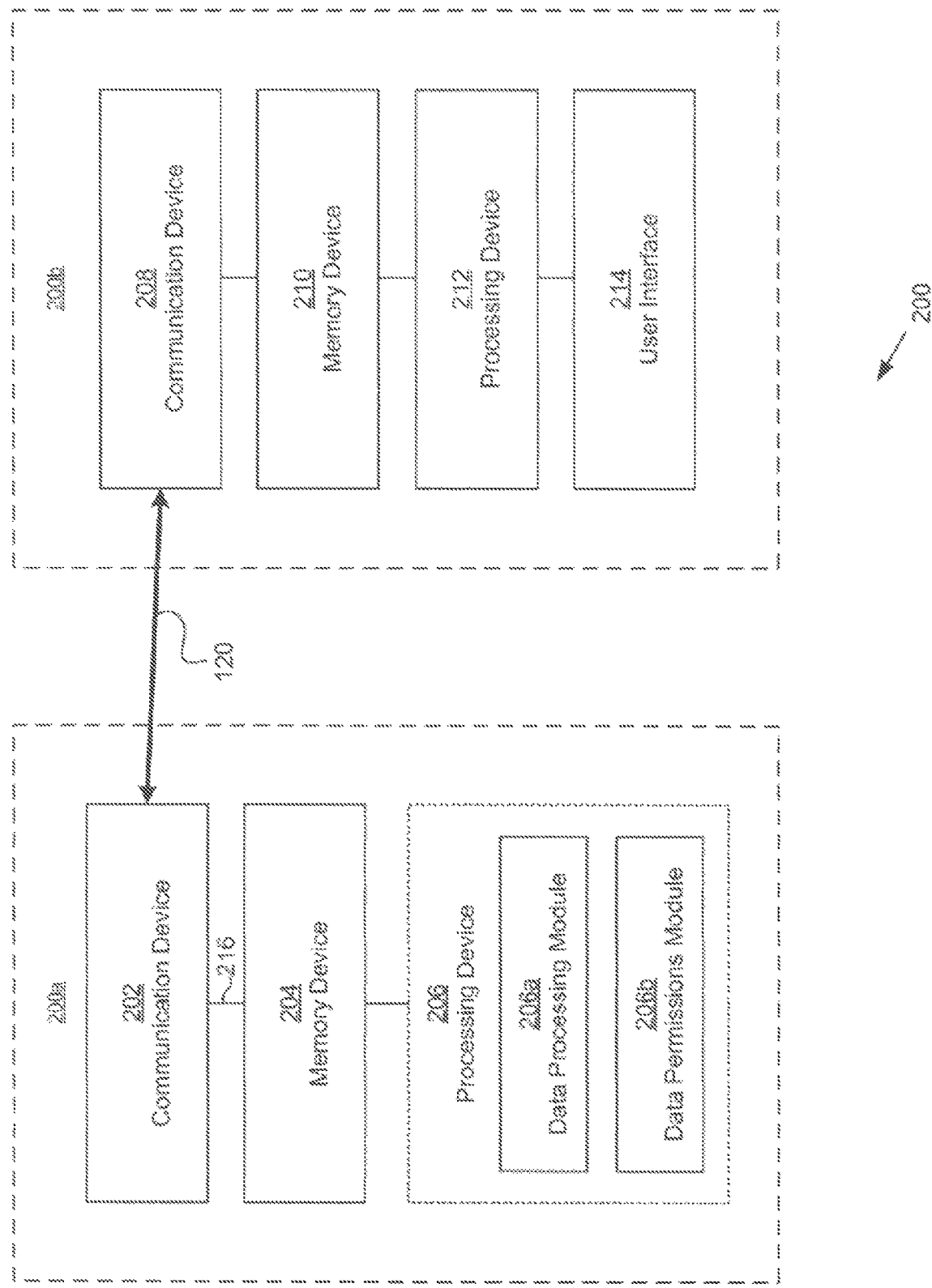
FIG. 2 illustrates a device schematic for various devices used in the autonomous human traffic monitoring system, according to an embodiment.

FIG. 2 illustrates a device schematic 200 for various devices used in the autonomous human traffic monitoring system 100, according to an embodiment. A server device 200a may moderate data communicated to a client device 200b based on data permissions to minimize memory resource allocation at the client device 200b.

The server device 200a may include a communication device 202, a memory device 204, and a processing device 206. The processing device 206 may include a data processing module 206a and a data permissions module 206b, where module refers to specific programming that governs how data is handled by the processing device 206. The client device 200b may include a communication device 208, a memory device 210, a processing device 212, and a user interface 214. Various hardware elements within the server device 200a and/or the client device 200b may be interconnected via a system bus 216. The system bus 216 may be and/or include a control bus, a data bus, and address bus, and so forth. The communication device 202 of the server device 200a may communicate with the communication device 208 of the client device 200b.

The data processing module 206a may handle inputs from the client device 200a. The data processing module 206a may cause data to be written and stored in the memory device 204 based on the inputs from the client device 200b. The data processing module 206a may receive data stored in the memory device 204 and output the data to the client device 200a via the communication device 202. The data permissions module 206b may determine, based on permissions data stored in the memory device, what data to output to the client device 200b and what format to output the data in (e.g., as a static variable, as a dynamic variable, and so forth). For example, a variable that is disabled for a particular user profile may be output as static. When the variable is enabled for the particular user profile, the variable may be output as dynamic.

The server device 200a may be representative of the cloud-based data management system 102. The server device 200a may be representative of the application server 106. The server device 200a may be representative of the data server 110. The server device 200a may be representative of the external application server 116. The memory device 204 may be representative of the database 108 and the processing device 206 may be representative of the data server 110. The memory device 204 may be representative of the external database 118 and the processing device 206 may be representative of the external application server 116. For example, the database 108 and/or the external database 118 may be implemented as a block of memory in the memory device 204. The memory device 204 may further store instructions that, when executed by the processing device 206, perform various functions with the data stored in the database 108 and/or the external database 118.

Similarly, the client device 200b may be representative of the user device 104. The client device 200b may be representative of the smartphone 112. The client device 200b may be representative of the personal computer 114. The memory device 210 may store application instructions that, when executed by the processing device 212, cause the client device 200b to perform various functions associated with the instructions, such as retrieving data, processing data, receiving input, processing input, transmitting data, and so forth.

As stated above, the server device 200*a* and the client device 200*b* may be representative of various devices of the autonomous human traffic monitoring system 100. Various of the elements of the autonomous human traffic monitoring system 100 may include data storage and/or processing capabilities. Such capabilities may be rendered by various electronics for processing and/or storing electronic signals. One or more of the devices in the autonomous human traffic monitoring system 100 may include a processing device. For example, the cloud-based data management system 102, the user device 104, the smartphone 112, the personal computer 114, the external application server 116, and/or the external database 118 may include a processing device. One or more of the devices in the autonomous human traffic monitoring system 100 may include a memory device. For example, the cloud-based data management system 102, the user device 104, the smartphone 112, the personal computer 114, the external application server 116, and/or the external database 118 may include the memory device.

The processing device may have volatile and/or persistent memory. The memory device may have volatile and/or persistent memory. The processing device may have volatile memory and the memory device may have persistent memory. Memory in the processing device may be allocated dynamically according to variables, variable states, static objects, and permissions associated with objects and variables in the autonomous human traffic monitoring system 100. Such memory allocation may be based on instructions stored in the memory device. Memory resources at a specific device may be conserved relative to other systems that do not associate variables and other object with permission data for the specific device.

The processing device may generate an output based on an input. For example, the processing device may receive an electronic and/or digital signal. The processing device may read the signal and perform one or more tasks with the signal, such as performing various functions with data in response to input received by the processing device. The processing device may read from the memory device information needed to perform the functions. For example, the processing device may update a variable from static to dynamic based on a received input and a rule stored as data on the memory device. The processing device may send an output signal to the memory device, and the memory device may store data according to the signal output by the processing device.

The processing device may be and/or include a processor, a microprocessor, a computer processing unit (CPU), a graphics processing unit (GPU), a neural processing unit, a physics processing unit, a digital signal processor, an image signal processor, a synergistic processing element, a field-programmable gate array (FPGA), a sound chip, a multi-core processor, and so forth. As used herein, "processor," "processing component," "processing device," and/or "processing unit" may be used generically to refer to any or all of the aforementioned specific devices, elements, and/or features of the processing device.

The memory device may be and/or include a computer processing unit register, a cache memory, a magnetic disk, an optical disk, a solid-state drive, and so forth. The memory device may be configured with random access memory (RAM), read-only memory (ROM), static RAM, dynamic RAM, masked ROM, programmable ROM, erasable and programmable ROM, electrically erasable and programmable ROM, and so forth. As used herein, "memory," "memory component," "memory device," and/or "memory unit" may be used generically to refer to any or all of the aforementioned specific devices, elements, and/or features of the memory device.

Various of the devices in the autonomous human traffic monitoring system 100 may include data communication capabilities. Such capabilities may be rendered by various electronics for transmitting and/or receiving electronic and/or electromagnetic signals. One or more of the devices in the autonomous human traffic monitoring system 100 may include a communication device, e.g., the communication device 202 and/or the communication device 208. For example, the cloud-based data management system 102, the user device 104, the smartphone 112, the personal computer 114, the application server 116, and/or the external database 118 may include a communication device.

The communication device may include, for example, a networking chip, one or more antennas, and/or one or more communication ports. The communication device may generate radio frequency (RF) signals and transmit the RF signals via one or more of the antennas. The communication device may receive and/or translate the RF signals. The communication device may transceive the RF signals. The RF signals may be broadcast and/or received by the antennas.

The communication device may generate electronic signals and transmit the RF signals via one or more of the communication ports. The communication device may receive the RF signals from one or more of the communication ports. The electronic signals may be transmitted to and/or from a communication hardline by the communication ports. The communication device may generate optical signals and transmit the optical signals to one or more of the communication ports. The communication device may receive the optical signals and/or may generate one or more digital signals based on the optical signals. The optical signals may be transmitted to and/or received from a communication hardline by the communication port, and/or the optical signals may be transmitted and/or received across open space by the networking device.

The communication device may include hardware and/or software for generating and communicating signals over a direct and/or indirect network communication link. For example, the communication component may include a USB port and a USB wire, and/or an RF antenna with Bluetooth™ programming installed on a processor, such as the processing component, coupled to the antenna. In another example, the communication component may include an RF antenna and programming installed on a processor, such as the processing device, for communicating over a Wi-Fi and/or cellular network. As used herein, "communication device" "communication component," and/or "communication unit" may be used generically herein to refer to any or all of the aforementioned elements and/or features of the communication component.

Various of the elements in the autonomous human traffic monitoring system 100 may be referred to as a "server." Such elements may include a server device. The server device may include a physical server and/or a virtual server. For example, the server device may include one or more bare-metal servers. The bare-metal servers may be single-tenant servers or multiple tenant servers. In another example, the server device may include a bare metal server partitioned into two or more virtual servers. The virtual servers may include separate operating systems and/or applications from each other. In yet another example, the server device may include a virtual server distributed on a cluster of networked physical servers. The virtual servers may include an operating system and/or one or more applications installed on the virtual server and distributed across the cluster of networked physical servers. In yet another example, the server device may include more than one virtual server distributed across a cluster of networked physical servers.

The term server may refer to functionality of a device and/or an application operating on a device. For example, an application server may be programming instantiated in an operating system installed on a memory device and run by a processing device. The application server may include instructions for receiving, retrieving, storing, outputting, and/or processing data. A processing server may be programming instantiated in an operating system that receives data, applies rules to data, makes inferences about the data, and so forth. Servers referred to separately herein, such as an application server, a processing server, a collaboration server, a scheduling server, and so forth may be instantiated in the same operating system and/or on the same server device. Separate servers may be instantiated in the same application or in different applications.

Various aspects of the systems described herein may be referred to as "data." Data may be used to refer generically to modes of storing and/or conveying information. Accordingly, data may refer to textual entries in a table of a database. Data may refer to alphanumeric characters stored in a database. Data may refer to machine-readable code. Data may refer to images. Data may refer to audio. Data may refer to, more broadly, a sequence of one or more symbols. The symbols may be binary. Data may refer to a machine state that is computer-readable. Data may refer to human-readable text.

Various of the devices in the autonomous human traffic monitoring system 100, including the server device 200a and/or the client device 200b, may include a user interface for outputting information in a format perceptible by a user and receiving input from the user, e.g., the user interface 214. The user interface may include a display screen such as a light-emitting diode (LED) display, an organic LED (OLED) display, an active-matrix OLED (AMOLED) display, a liquid crystal display (LCD), a thin-film transistor (TFT) LCD, a plasma display, a quantum dot (QLED) display, and so forth. The user interface may include an acoustic element such as a speaker, a microphone, and so forth. The user interface may include a button, a switch, a keyboard, a touch-sensitive surface, a touchscreen, a camera, a fingerprint scanner, and so forth. The touchscreen may include a resistive touchscreen, a capacitive touchscreen, and so forth.

Various methods are described below. The methods may be implemented by the data analysis system 100 and/or various elements of the data analysis system described above. For example, inputs indicated as being received in a method may be input at the client device 200b and/or received at the server device 200a. Determinations made in the methods may be outputs generated by the processing device 206 based on inputs stored in the memory device 204. Correlations performed in the methods may be executed by the correlation module 206a. Inference outputs may be generated by the inference module 206b. Key data and/or actionable data may be stored in the knowledge database 204b. Correlations between key data and actionable data may be stored in the knowledge database 204b. Outputs generated in the methods may be output to the output database 204c and/or the client device 200b. In general, data described in the methods may be stored and/or processed by various elements of the data analysis system 100.

Figure 3:
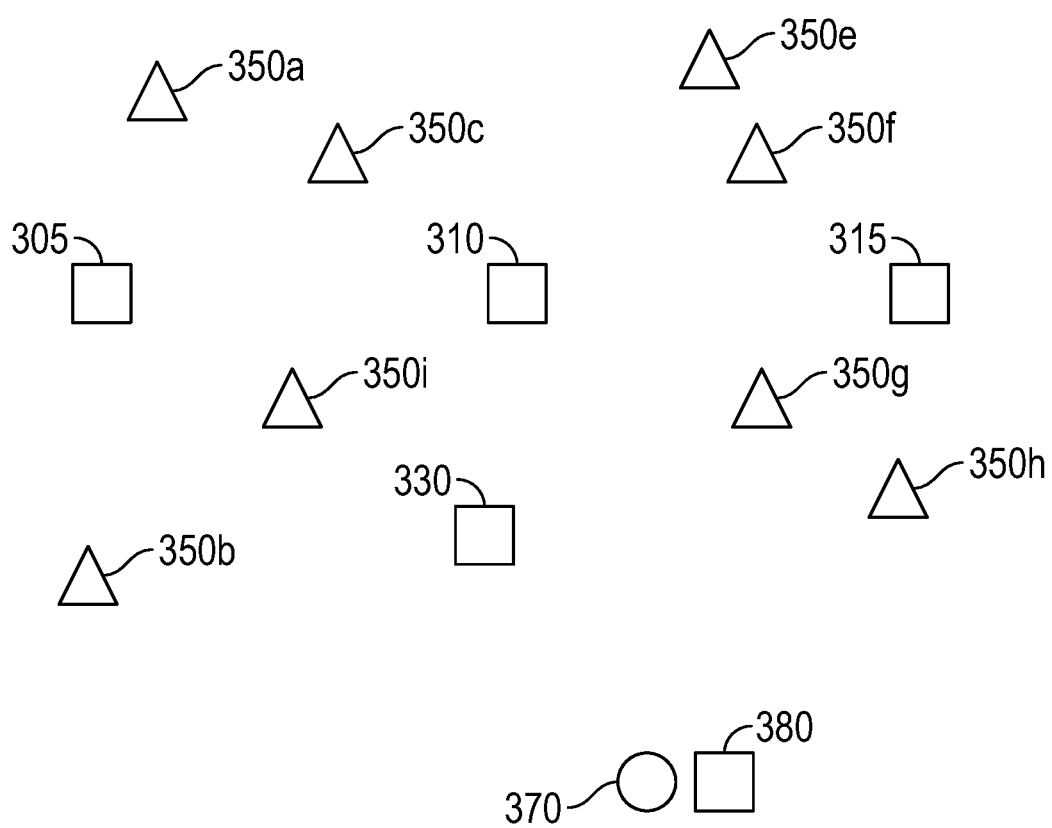
FIG. 3 illustrates the autonomous human traffic monitoring system, according to an embodiment.

FIG. 3 illustrates the autonomous human traffic monitoring system 300, according to an embodiment. The autonomous human traffic monitoring system 300 includes scanner nodes 305, 310, and 315 that monitor in real-time nearby Wi-Fi enabled devices (or Wi-Fi enabled devices) 350a, 350b, 350c, 350d, 350e, 350f, 350g, and 350h for electronic transmission, including, but not limited to Wi-Fi probe packets. Additional electronic transmission that can be monitored include Bluetooth probe packets, and other electronic transmissions. The scanner nodes 305, 310, and 315 are connected to a server, or server node 330. The server node 330 is configured to run a software module or software modules that include an accumulator software module. The accumulator software module is configured to accumulate data from the scanner nodes and/or the server nodes. The data can be processed solely at the user device 380 via the accumulator software module or it can also be processed at the scanner nodes, 305, 310, 315, processed at the server node 330, and or processed on the user device 380. The scanner nodes 305, 310, and 315 and server node 330 can include a microcontroller and a receiver. The microcontroller and/or microprocessors can be selected from suitable microprocessors, including, but not limited to ESP32 and ESP8266microcontroller, available from Espressif, and Arduino microcontrollers.

Examples of receivers, include, but are not limited to Wi-Fi radios, such as FN-LINK 6188S-UF, 8DEVICES BLACK-BEAN, COMPEX WLE1216V5-20; LoRa radio transceivers, such as Semtech's SX1276 (the radio that my implementation uses) Adafruit's RFM96 W, IMST GmbH's iM880B-L. An example of a combination microcontroller and receiver is the Pycom quad-bearer radio integrated LoPy4 microcontroller. Additional combination microcontroller and receivers include Raspberry Pi 4B (as well as products from Raspberry Pi), QuickSpot's Walter, insigh.io's SDI-12 Host Board.

FIG. 3 further illustrates a user 370 and a user smart device 380. Embodiments include a smart device 380 that can also be the server node 330, wherein the server node 330 is incorporated in the user's smart device 380. The user smart device 380 or user device, can include a user processing device, a user interface, a user memory device, and a user receiver device.

The Wi-H enabled devices 350a-h can send electronic transmissions, such as Wi-Fi probe packets that are received by nearby scanner nodes 305, 310 and 315. The Wi-Fi probe packets can be received by a single scanner node 305, or multiple scanner nodes 305, 310 and 315. The number of scanner nodes 305, 310, 315 employed by the autonomous human traffic monitoring system 300 can be varied based on the area and/or building to monitored.

The scanner nodes 305, 310, 315 operate software modules, the organize, store, and transmit information and data about the Wi-Fi probe packets to the sever node 330. The server node 330 operates software modules, such as an accumulator program. The accumulator program is configured to runs on the server node 330 and configured to collect, organize and analyze data from the server nodes. The accumulator program can be designed to run on iOS, Android, Windows, MacOS, Linux, or other suitable operating systems. The accumulator program can be designed to operate on a user's smart device 380. Embodiments of the accumulator program can also be designed to provide a user interface (UI) for the autonomous human traffic monitoring system 300. The user 370 interacts with the user interface on the user's device or user's smart device 380, such as a mobile phone or a tablet. The accumulator program receives data from the scanner nodes 305, 310, and 315 and compiles the data into a comprehensible format to present it to the user 370 via the user interface on the user's device or user's smart device 380. Alternate embodiments can have a standalone server node 330 that transmits data to the user's smart device 380 which presents a user interface to the user 370 with data accumulated from the scanner nodes 305, 310, 315.

The scanner nodes 305, 310, 315 can be located at points around the area or building to be monitored to receive Wi-Fi probe packets from smart devices. Preferably, the scanner nodes 305, 310, 315 are positioned at elevated locations to provide maximum reception of the Wi-Fi probe packets, with a reduction of attenuation of the signal. Embodiments include scanner nodes 305, 310, 315 located on ceilings, in light fixtures, in molding, or other areas of elevation around the area of building to be monitored.

The scanner nodes 305, 310, 315 and the server nodes can be powered by batteries, hard wired into the electric system, powered via PoE (Power over Ethernet) if they are in proximity to the computer or router, and/or have optional solar cells, solar power, or wind powered batteries, wind power, for primary or back-up power. Preferably, the server node can be powered by power over ethernet if it is located near a computer, server, server rack or other electronics.

Embodiments of the autonomous human traffic monitoring system 300 utilizes long range (LoRa) transmissions to receive Wi-Fi probe packets from smart devices 350a-h in the range of the scanner nodes 305, 310, 315. LoRa is a low power wide area network (LPWAN) physical layer communication mechanism that provides long-range, low power, low cost, and limited data transmission. LoRa is a preferred transmission mechanism for monitoring Wi-Fi probe packets. Additional transmission mechanisms, include, but are not limited to Bluetooth, Wi-Fi, NB-IoT, Sigfox, and/or Cellular/RAN.

The autonomous human traffic monitoring system 300 can operate at long distances, even where long-range communication infrastructure, such as the cellular network, may not be available. Examples include underground locations, such as subways or deep basements, where cellular networks may not be available. The long range of LoRa transmissions allows for a property-wide wireless network with a minimal number of scanner nodes 305, 310, 315. The low power requirements and low cost of integrated circuits make it possible to deploy the system to cover large properties for an affordable price. The low data rate of LoRa does not inhibit the autonomous human traffic monitoring system 300 because the Wi-Fi probe packets are transmitted within bandwidth suitable for LoRa.

The server node 330 includes at least two software modules, which can be two separate software programs or a single software program that can provide at least two separate modalities. The first software module can be a hyper text transfer protocol (HTTP) web server module, which can be a custom HTTP web server module or standard HTTP web server module, such as HTTPS (secure), other programing languages that can be employed include, but are not limited to Python, JavaScript, Rust, and other suitable languages. The HTTP web server module can send and respond to HTTP GET requests or other commands. The HTTP GET requests and/or commands can include retrieval of a list of all known scanner nodes 305, 310, 315 and retrieval of the data collected by the scanner nodes 305, 310, 315. These two of the HTTP GET requests or commands that are supported by the HTTP web server module of an embodiment. The server node 330 can review the uniform resource location (URL) path of the HTTP GET requests. A review of the URL path allows the server node 330 to count the requests or commands and make a determination of how many scanner nodes 305, 310, 315 are sending data. Embodiments of the server node 330 can return an accumulated list of all scanner nodes 305, 310, 315 in a format as follows if the path is/probe:

{"aa:00:bb:11:cc:22", "ab:00:cd:11:ef:22", "ab:01:bc:12:cd:23"}

The server node 330 can return accumulated data from the scanner nodes 305, 310, 315 in the following format if the path is/scan:

| { "aa:00:bb:11:cc:22": | [ "dd:33:ee:44:ff:55", "gg:66:hh:77:ii:88", "jj:99:kk:11:ll:22" ], |
|---|---|
| "ab:00:cd:11:ef:22": | [ "jk:33:lm:44:no:55", "pq:66:rs:77:tu:88", "vw:99:xy:11:za:22" ], |
| "ab:01:bc:12:cd:23": | [ "de:34:ef:45:fg "gh:67:hi:78:ij:89", "jk:90:kl:01:lm:12" ] } |

The second software module can be a LoRa transceiver module. The LoRa transceiver module can operate on the server node 330 and the scanner nodes 305, 310, 315. The first and second software modules can be configured to implement a Sequence Number Controlled Flooding (SNCF) algorithm to ensure that each scanner node 305, 310, 315 and/or the server node 330 receives data transmissions from all scanner nodes 305, 310, 315 regardless of distance between the scanner nodes 305, 310, 315.

The software modules can further be configured to implement a first in first out (FIFO) queue of all LoRa data transmissions. The list of data transmissions in the FIFO queue can be configured to exclude previously recorded data transmissions. New data transmissions can be added to the queue, retransmitted, and then processed according to a destination and payload imperative.

There can be at least three possible data transmission formats. All data transmission formats have a destination parameter, a request parameter, and a timestamp. The timestamp in the data transmission can be a sequence number in the implementation of SNCF. The first format has a source address parameter that can be stored by the server node 330 once received. Embodiments of the first data transmission format can be as follows:

{"destination": "server",
  "source": "aa:00:bb:11:cc:22",
  "request": "scanner beacon",
"timestamp": "20"}

The second and third data transmission formats can be related to returning data to the server node 330 from scanner nodes 305, 310, 315. In the second data transmission format, a data parameter is added to the data transmission, instead of a source address parameter. The data parameter can contain the hardware address of the smart device 350a-h or scanner node 305, 310, 315, such as the media access control (MAC) address of the scanner node 305, 310, 315 sending the data transmission, as well as individual hardware addresses, such as individual MAC addresses from detected Wi-Fi enabled smart devices 350a-h.

The third data transmission format can be similar or identical to the first data transmission format (beacon), with a change in the type of request in the request parameter. Embodiments of the third data transmission format can be as follows:

```
{ "destination": "server",
    "request": "data server node submission",
        "data": { "aa:00:bb:11:cc:22":
            { "dd:33:ee:44:ff:55" }
  "timestamp": "20" }
{ "destination": "server",
      "source": "aa:00:bb:11:cc:22",
    "request": "end of scan",
    "timestamp": "20" }
```

The data transmissions can contain various command sequences. Embodiments include one of three command sequences. In an embodiment, the first command sequence serves as a beacon data transmission from the scanner nodes 305, 310, 315 that can inform the server node 330 of the existence of the individual scanner nodes 305, 310, 315. The source address parameter in the beacon data transmission can be stored in a memory device in the server node 330. The memory device contains a list of all known scanner nodes 305, 310, 315 after the beacon data transmission is received by the server node 330.

The scanner nodes 305, 310, 315 can send a single data transmission to the server node 330 including the hardware addresses of the scanner nodes: 305, 310, 315, such as MAC addresses, repeatedly, for example every 1 to 60 second, preferably every 5 to 30 second, and most preferably every 7 to 15 seconds. Embodiments can send the hardware address every 10 seconds to ensure that the server node 330 is constantly up to date with a list of the scanner nodes 305, 310, 315 in the autonomous human traffic monitoring system 300.

Two additional command sequences can inform the server node 330 of the type of data within the data transmissions. The two additional command sequences can include data about the detected smart devices, including, but not limited to hardware addresses, such as MAC addresses and/or detected Wi-Fi MAC addresses.

Scanner nodes 305, 310, 315 can send an independent data transmission to the server node 330 for the detected Wi-Fi MAC addresses to avoid LoRa buffer overflow. After transmitting the data from the detected Wi-Fi MAC addresses to the server node 330, the scanner nodes 305, 310, 315 can send a data transmission to inform the server node 330 that the results are complete and the next set of data will be a new scan.

A scan can be identified as a set period of time in which individual hardware addresses are being monitored and recorded within a coverage area, such as a defined area or a building. The scan can be anywhere from 1 second to 30 minutes, preferably 30 seconds to 10 minutes, and most preferably between 1 minute and 5 minutes. After a scan has ended, the data including, but not limited to, the total number of unique hardware addresses detected by each scanner node is sent to the server node 330 and can be presented to the user 370 via the user interface on the user smart device 380.

Figure 4:
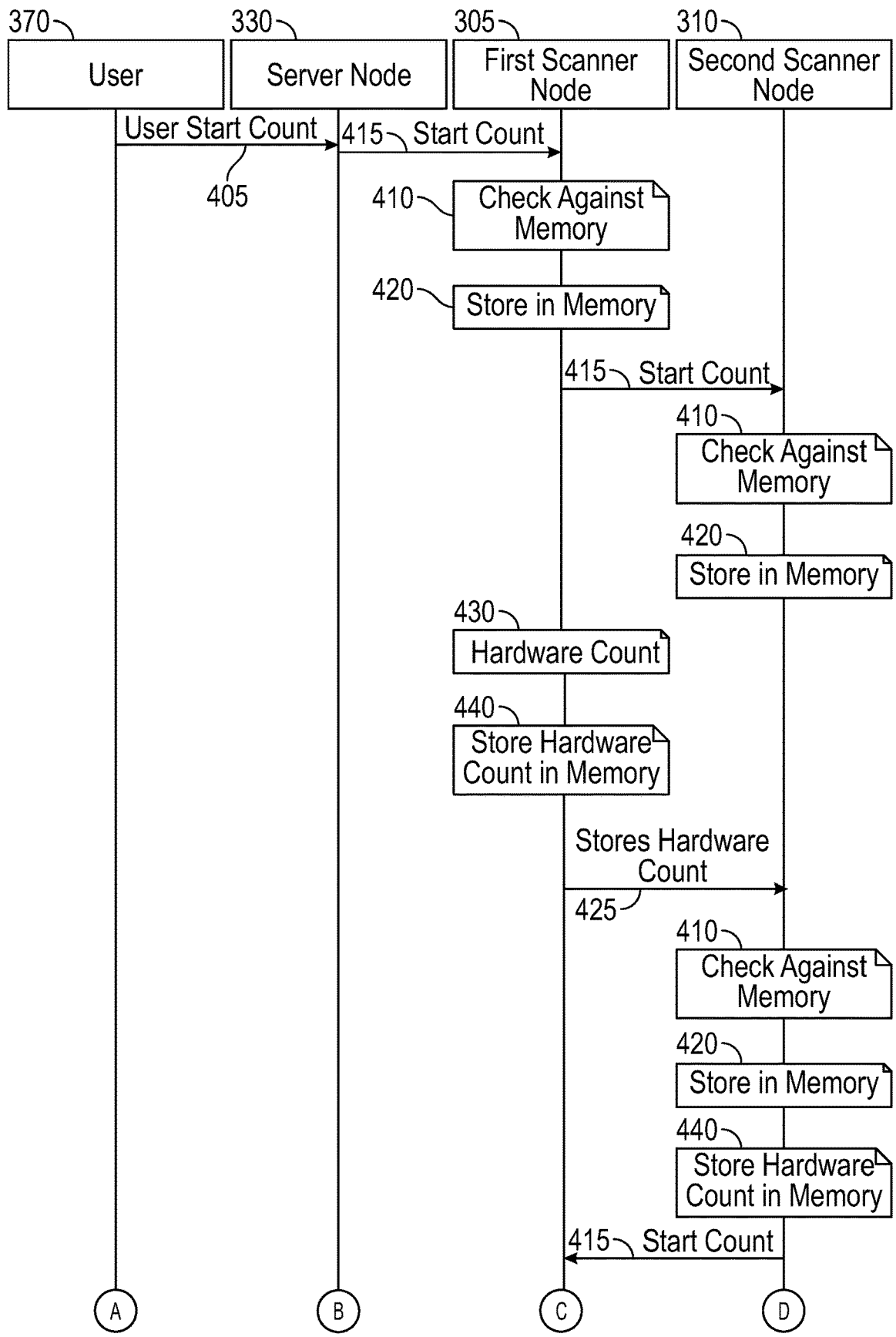
FIG. 4 illustrates a flow chart for an autonomous human traffic monitoring system, according to an embodiment.
Figure 4:
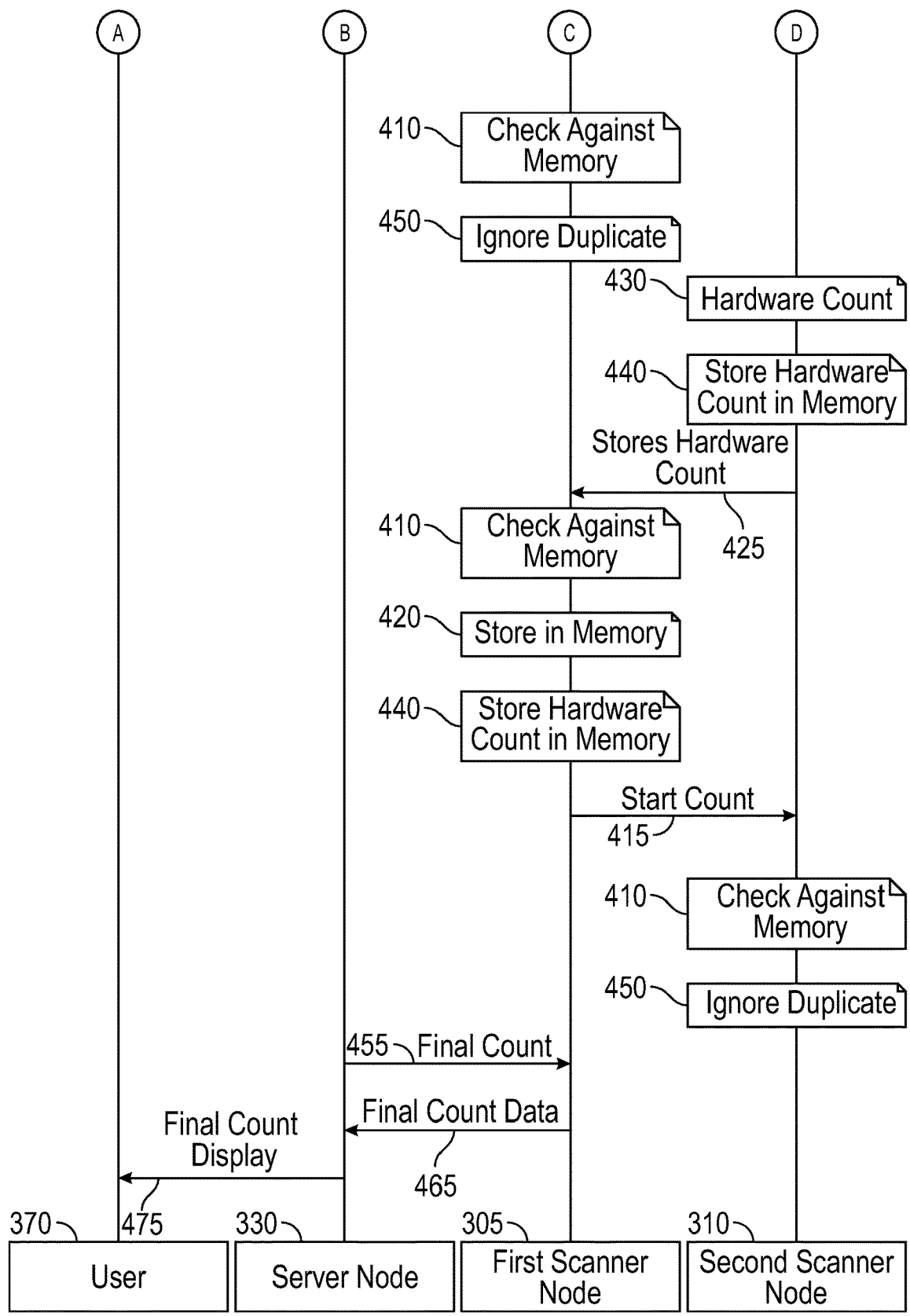

FIG. 4 illustrates a flow chart for an autonomous human traffic monitoring system 400, according to an embodiment. FIG. 4 illustrates a user 370 interacting with a server node 330, which is in contact with at least two scanner nodes, first scanner node 305 and second scanner node 310. The autonomous human traffic monitoring system 300 is designed and configured to monitor unique hardware addresses within a set area or building during a set scan. The user 370 can initiate a request count 405, which allows a user device, such as a user smart device 380 to start the counting process. The user smart device 380 can include or be in electronic contact with a server node 330. The server node 330 can then send a start count command 415, via HTTP POST over Wi-Fi or cellular transmissions, to the first scanner node 305, or to each scanner node, for example first scanner node 305 and second scanner node 310 in the autonomous human traffic monitoring system 300. In a preferred system, the server node 330 only sends the start count command 415 to the first scanner node 305.

The start count command 415 directs the first scanner node 305 to begin checking for unique hardware addresses and to send start count commands to the additional scanner nodes. First scanner node 305 can then run a check against memory step 410 to determine if the first scanner node 305 has already received the start count command 415 for a set scan. The check against memory step 410 checks for matches or identical commands, messages and/or data transmissions that have been stored, or saved in a memory device. Next, first scanner node 305 can run a store in memory step 420 to record the start count command 415 for the set scan in a memory device of the first scanner node 305. A processing device associated with the first scanner node 305, such as a microprocessor, processes the data in the start count command 415 and compares it with the data in the memory device. The processing device also sends and receives the commands and data transmissions from processing devices in other scanner nodes, server nodes and/or user devices. Additional processing devices can be referred to as first, second, third, fourth, depending on the number of additional scanner nodes in the system.

First scanner node 305 can then repeat the start count command 415 to the additional scanner nodes, for example to scanner node 310. The start count commands 415 can be sent via LoRa or other electronic means suitable for the scanner nodes to communicate. In an alternate embodiment, the start count command 415 is sent directly from the server node 330 to each individual scanner node 305, 310, 315.

After second scanner node 310 receives the stall count command 415, second scanner node 310 can run a check against memory step 410 to determine if the second scanner node 310 has already received the start count command 415 from the first scanner node 305, the server node 330, or an additional scanner node. Second scanner node 310 then runs a store in memory step 420, recording the start count command 415 for the new scan. The store in memory step 420 records and stores the start count command 415 on a memory device associated with second scanner node 310. A processing device associated with the second scanner node 310, such as a microprocessor, processes the data in the start count command 415 and compares it with the data in the memory device. Similar steps are taken by the additional scanner nodes, for example third scanner node 315, in the autonomous human traffic monitoring system 300. The memory devices as referred to herein can be referred to as first, second, third, fourth depending on the number of additional scanner nodes in the system.

First scanner node 305 can then conduct a hardware device count step 430, in which first scanner node 305 creates a list of the unique hardware addresses it has received from Wi-Fi enabled smart devices 350a-h during a set scan. The hardware addresses can be transmitted as Wi-Fi probe packets from the Wi-Fi enabled smart devices 350a-h. First scanner node 305 can then run a store hardware device count in memory step 440 storing the unique hardware addresses data received by the first scanner node 305 during a set scan. The unique set of hardware addresses is stored as a stored count on a memory device associated with the first scanner node 305. A processing device ensures that only unique hardware addresses are stored in the memory device for a set scan. Embodiments can compare hardware stored counts from the scanner nodes to ensure duplicative and/or missing hardware devices are not incorrectly counted.

First scanner node 305 can then send a stored hardware device count data transmission 425 to the additional scanner nodes in the autonomous human traffic monitoring system 300, such as second scanner node 310. Second scanner node 310 can run a check against memory step 410 to verify if the second scanner node 310 has already received the stored hardware device count data transmission 425 from first scanner node 305. If second scanner node 310 has not already received the stored hardware device count data transmission 425 from first scanner node 305, second scanner node 310 conducts a store in memory step 420, recording the receipt of the stored hardware device count data transmission 425 from first scanner node 305 for the set scan. Next, second scanner node 310 conducts a store hardware device count in memory step 440 for the data associated with the hardware device count for first scanner node 305. The store hardware device count in memory step 440 records the information associated with the unique hardware addresses found by the first scanner node 305 on a memory device associated with the second scanner node 310. The memory device stores the information as a stored hardware device count. A processing device can process the data associated with the stored hardware device count and compare the data to other data stored on the memory device.

Second scanner node 310 can also send the start count command 415 to the additional scanner nodes, including first scanner node 305. First scanner node 305 can run a check against memory step 410 to determine if the first scanner node 305 has already received the start count command 415 from a server node 330 or a scanner node 310, 315, if the first scanner node 305 determines it already has a stored or recorded a start count command 415 for the set scan it can run a ignore duplicate step 450 to remove and/or not follow the duplicative command. The determination of duplicative commands is processed by a processing device in view of data stored on a memory device.

Second scanner node 310 can run a hardware device count step 430 in which second scanner node 310 counts the unique hardware addresses received by the second scanner node 310 during the set scan. The second scanner node 310 then runs a store hardware device count in memory step 440 to record the unique hardware addresses received by second scanner node 310 during the hardware device count step 430. The information recorded or stored in the store hardware device count in memory step 440 is stored on a memory device and processed by a processing device, both of which can be associated with the second scanner node 310. The second scanner node 310 can then send stored hardware device count data transmissions 425 to the additional scanner nodes in the autonomous human traffic monitoring system 300, such as first scanner node 305.

After first scanner node 305 receives the stored hardware device count data transmission 425 from the second scanner node 310, the first scanner node 305 can run a check against memory step 410 to determine if the first scanner node 305 has already received the stored hardware device count data transmission 425 from the second scanner node 310. If the data transmission is determined to be new, first scanner node 305 runs a store in memory step 420 to record the data transmission from the second scanner node 310. Next, first scanner node 305 conducts a store hardware device count in memory step 440 for the data associated with the hardware device count for second scanner node 310. The store hardware device count in memory step 440 records the information associated with the unique hardware addresses found by the second scanner node 310 on a memory device associated with the first scanner node 305. The transmission of the hardware device counts from scanner node to scanner node ensures that all scanner nodes within the autonomous human traffic monitoring system 300 have a complete set of data for the set scan. It also ensures that nodes that are outside the range of a primary node can transmit their data to the primary node via the secondary nodes. The primary node can be the only node connected to the server node, such as scanner node 305 in the embodiment shown in FIG. 4.

First scanner node 305 can send repeated start count commands 415 to the additional scanner nodes, including second scanner node 310. Second scanner node 310 can run a check against memory step 410 to determine if the second scanner node 310 has already received the start count command 415 from a server node 330 or a scanner node 305, 315. A processor device processes the data associated with the start count command 415 based on data on a memory device to determine if the command is a new command. If the second scanner node 310 determines it already has a stored or recorded a start count command 415 for the set scan it can run a ignore duplicate step 450 to remove and/or not follow the duplicative command. The ignore duplicate step 450 or ignore duplicate module is processed via a processing device employing a software module that runs a ignore duplicate module. The ignore duplicate module removes and/or ignores duplicate commands, duplicate data, duplicate messages.

Server node 330 can send a final count command 455 to the scanner nodes 305, 310, 315, or just to the primary scanner node, for example first scanner node 305. The final count command 455 can be sent via Wi-Fi as an HTTP GET request, via LoRa, or other suitable electronic data transmission. The final count command 455 requests the scanner nodes to end the set scan and transmit a final count of the unique hardware addresses to allow the server node 330 to prepare a final count of unique hardware addresses for the set scan. The response to the final count command 455 from the scanner nodes, or just the primary scanner node, is a final count data transmission 465 from primary or first scanner node 305, and/or similar final count data transmissions 465 from the additional scanner nodes, 310, 315. The primary scanner node, such as the first scanner node 305 can send the information from the individual scanner nodes to the server node 330. Alternatively, the individual scanner nodes can send individual information directly to the server node 330 or directly to the user device 380. The final count data allows the server node 330 to prepare a final count of the unique hardware addresses within the coverage area, such as a set area or building during a set scan. A processing device associated with the server node 330 processes the information and/or data associated with the final count. The final count is then sent as a final count display 475 to made available to the user 370 via the user interface on the user mobile device 380 (see FIG. 3).

Figure 5:
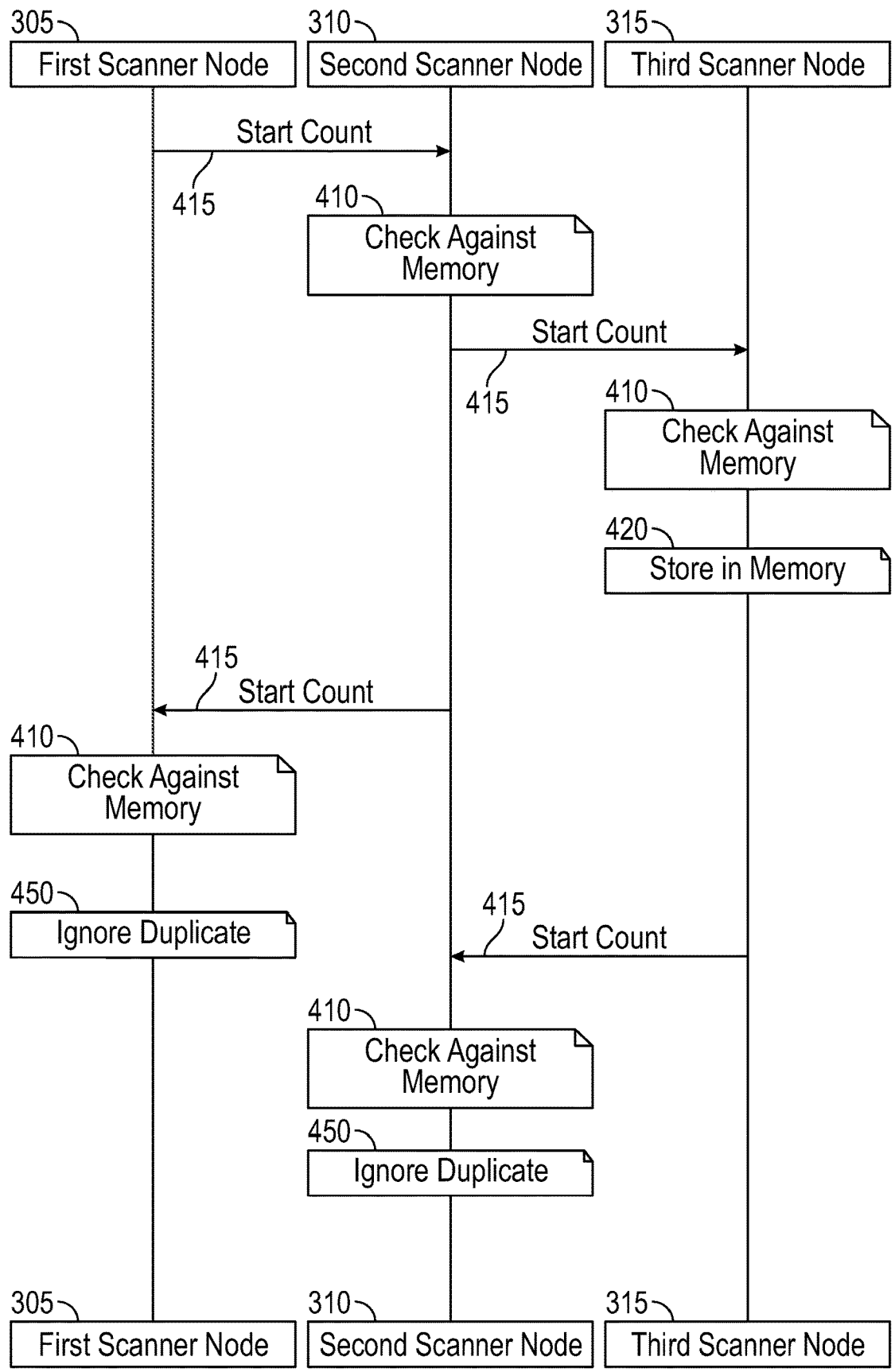
FIG. 5 illustrates a flow chart for an autonomous human traffic monitoring system, according to an embodiment.

FIG. 5 illustrates a flow chart of the interactions between scanner nodes: 305, 310, 315, according to an embodiment. FIG. 5 illustrates three scanner nodes 305, 310, 315. The autonomous human traffic monitoring system 300 is not limited to three scanner nodes, nor does it require three scanner nodes, the embodiment presented in FIG. 5 is illustrative of an embodiment.

The individual scanner nodes 305, 310, 315 receive electronic transmissions from Wi-Fi enabled smart devices

350*a-h*. The electronic transmissions can include Wi-Fi probe packets identifying the individual Wi-Fi enabled smart devices 350*a-h*. The scanner nodes 305, 310, 315 can communicate with each other via LoRa data transmissions. The autonomous human traffic monitoring system 300 can be configured to ensure that individual Wi-Fi enabled smart devices 350*a-h* are not being missed or double counted.

As illustrated in FIG. 5, the first scanner node 305 has already received a start count command 415 (preferably directly from the server node 330 (not shown)). First scanner node 305 can then repeat the start count command 415 to the additional scanner nodes, for example to scanner node 310, 315. The additional scanner node 310, 315 can then send repeat start count commands 415 to other scanner nodes in the autonomous human traffic monitoring system 300. As illustrated in FIG. 5, if the individual scanner nodes have already received a start count command 415 for a set scan, the individual scanner nodes will remove duplicative commands via step 450. This method and system allow for the start count command 415 to be efficiently and effectively circulated between the scanner nodes in the autonomous human traffic monitoring system 300.

Figure 6:
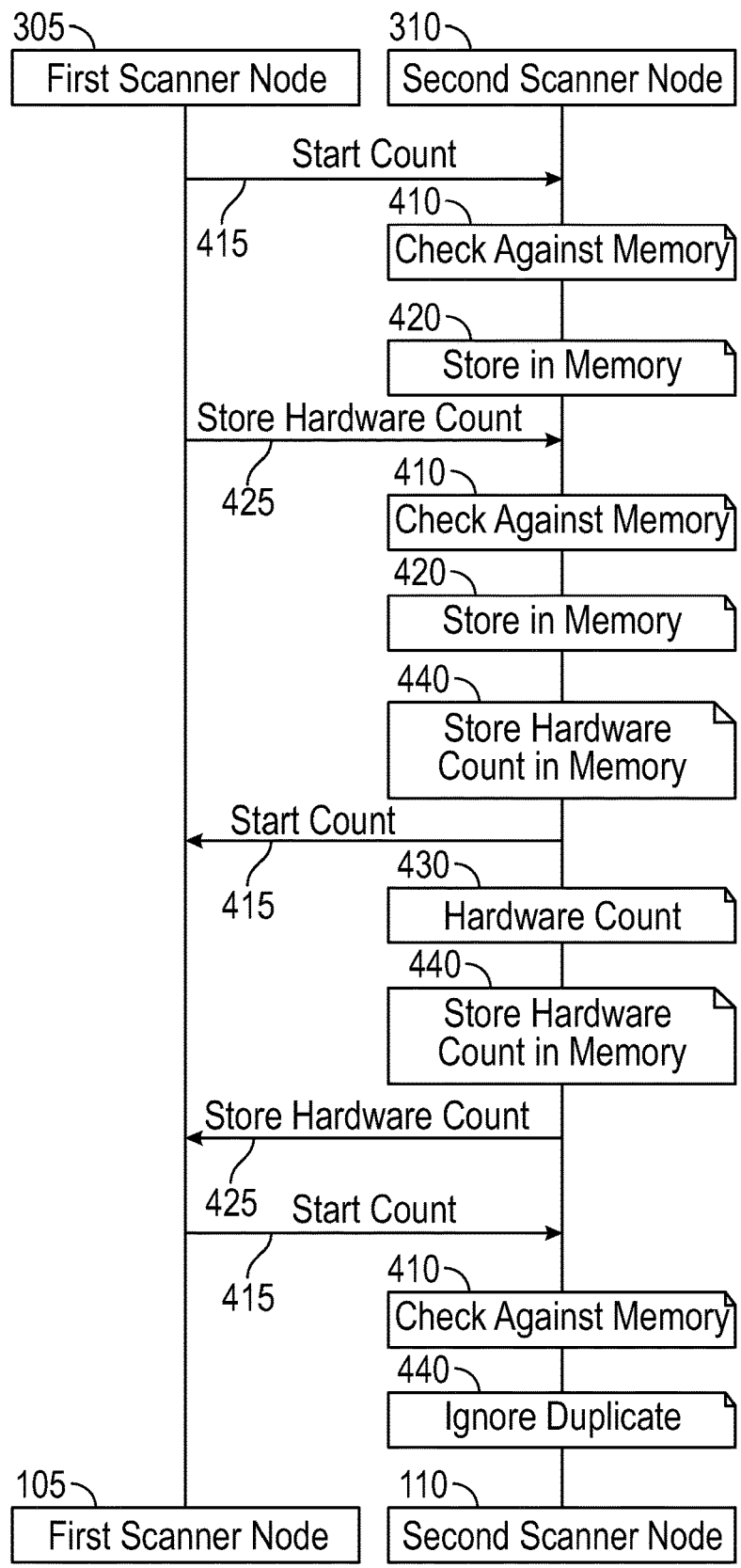
FIG. 6 illustrates a flow chart for an autonomous human traffic monitoring system, according to an embodiment.

FIG. 6 illustrates an alternate flow chart of the interactions between scanner nodes 305 and 310, according to an embodiment. In the embodiment in FIG. 6 first scanner node 305 transmits a start count command 415 to second scanner node 310. The start count command 415 is a repeated command from the server node 330 (not shown) instructing the server nodes to begin the hardware address count for a set scan.

After the second scanner node 310 receives the start count command 415, second scanner node 310 can run a check against memory step 410 to determine if the second scanner node 310 has already received the start count command 415 from the first scanner node 305, the server node 330, or an additional scanner node. Second scanner node 310 then runs a store in memory step 420, recording the start count command 415 for the set scan. The store in memory step 420 records and stores the start count command 415 on a memory device associated with second scanner node 310. A processing device compares the data on the memory device to determine if the start count command 415 has already been received.

First scanner node 305 can then conduct a hardware device count step 430, in which first scanner node 305 creates a list of the unique hardware addresses it has received from Wi-Fi enabled smart devices 350*a-h* during a set scan (not shown in FIG. 6). First scanner node 305 can then send a stored hardware device count data transmission 425 to the additional scanner nodes in the autonomous human traffic monitoring system 300, such as second scanner node 310. Second scanner node 310 can run a check against memory step 410 to verify if it has already received the stored hardware device count data transmission 425 from first scanner node 305. If second scanner node 310 has not already received the stored hardware device count data transmission 425 from first scanner node 305, second scanner node 310 conducts a store in memory step 420, recording the receipt of the stored count data transmission 425 from first scanner node 305 for the set scan. Next, second scanner node 310 conducts a store hardware device count in memory step 440 for the data associated with the hardware device count for first scanner node 305. The store hardware device count in memory step 440 records the information associated with the unique hardware addresses found by the first scanner node 305 on a memory device associated with the second scanner node 310.

Second scanner node 310 can also send start count commands 415 to the additional scanner nodes, including first scanner node 305. The system can also be configured to send data transmissions from scanner node to scanner node identifying the individual scanner nodes in the system. This allows the system to determine if all scanner nodes have registered a hardware device count data transmission for each scan.

Second scanner node 310 can run a hardware device count step 430 in which second scanner node 310 counts the unique hardware addresses received by the second scanner node 310 during the set scan. The second scanner node 310 then runs a store hardware device count in memory step 440 to record the unique hardware addresses received by second scanner node 310 during the hardware device count step 430. The data recorded or stored in store hardware device count in memory step 440 is stored on a memory device associated with the second scanner node 310. The data recorded or stored in store hardware device count in memory step 440 can be processed by a processing device to ensure duplicative or incorrect data is not stored. The second scanner node 310 can then send stored hardware device count data transmissions 425 to the additional scanner nodes in the autonomous human traffic monitoring system 300, such as first scanner node 305. This step ensures that every scanner node has a stored hardware device count from each scanner node in the system 300.

First scanner node 305 can send repeated start count commands 415 to the additional scanner nodes, including second scanner node 310. Second scanner node 310 can run a check against memory step 410 to determine if the second scanner node 310 has already received the start count command 415 from a server node 330 or a scanner node 305, 315. If the second scanner node 310 determines it already has a stored or recorded a start count command 415 for the set scan it can run a ignore duplicate step 450 to remove and/or not follow the duplicative command.

Figure 7:
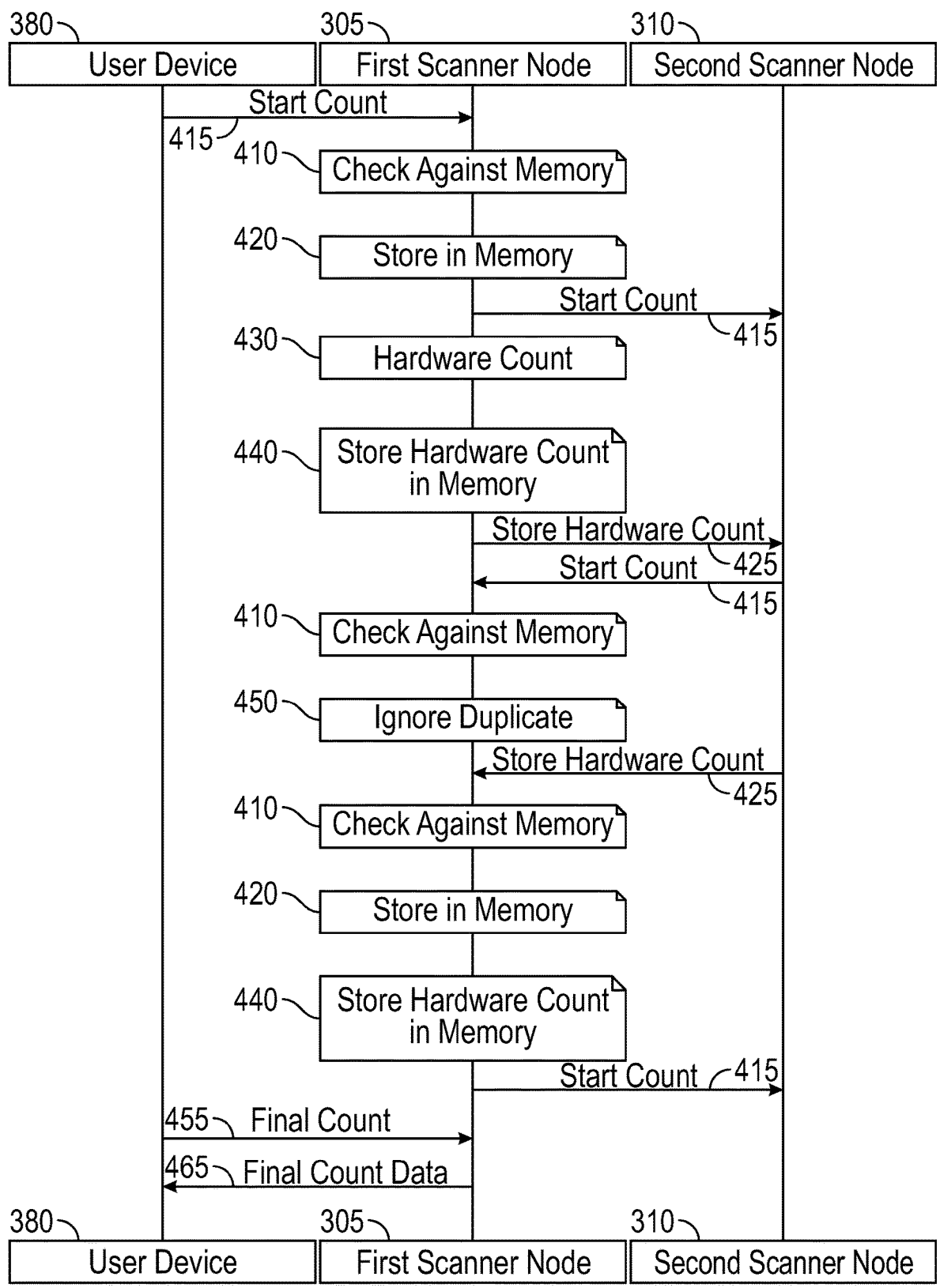
FIG. 7 illustrates a flow chart for an autonomous human traffic monitoring system, according to an embodiment.

FIG. 7 illustrates a flow chart for an autonomous human traffic monitoring system 300, according to an embodiment. FIG. 7 illustrates a server node 330, a first scanner node 305, and a second scanner node 310 interacting to monitor unique hardware addresses within a set area or building during a set scan. The server node 330 can be a mobile device, such as the user mobile device 380.

FIG. 7 illustrates an embodiment in which a user 370 has requested a count from the autonomous human traffic monitoring system 300. The user 370 has directed the user smart device 380 to send a start count command 415. The user smart device 380 can send a start count command 415, via HTTP POST over Wi-Fi or cellular transmissions, to the first scanner node 305, or to each scanner node, for example first scanner node 305 and second scanner node 310 in the autonomous human traffic monitoring system 300. In a preferred system, the user smart device 380 only sends the start count command 415 to the first scanner node 305.

The start count command 415 directs the first scanner node 305 to begin checking for unique hardware addresses and to send start count commands to the additional scanner nodes. First scanner node 305 can then run a check against memory step 410 to determine if the first scanner node 305 has already received the start count command 415 for a set scan. Next, first scanner node 305 can run a store in memory step 420 to record the start count command 415 for the set scan in a memory device of the first scanner node 305. A processing device processing data stored on a memory determines if the start count command is new.

First scanner node 305 can then repeat the start count command 415 to the additional scanner nodes, for example to scanner node 310. The repeated start count commands 415 can be sent via LoRa or other electronic means suitable for the scanner nodes to communicate. In an alternate embodiment, the start count command 415 is sent directly from the user smart device 380 to each individual scanner node 305, 310, 315.

First scanner node 305 can then conduct a hardware device count step 430, in which first scanner node 305 creates a list of the unique hardware addresses it has received from Wi-Fi enabled smart devices 350a-h during a set scan. The hardware addresses can be transmitted as Wi-Ti probe packets from the Wi-Fi enabled smart devices 350a-h. First scanner node 305 can then run a store hardware device count in memory step 440 storing the unique hardware address data received by the first scanner node 305 during a set scan. The unique set of hardware addresses is stored on a memory device that can be associated with the first scanner node 305.

First scanner node 305 can then send a stored hardware device count data transmission 425 to the additional scanner nodes in the autonomous human traffic monitoring system 300, such as second scanner node 310.

Second scanner node 310 can also send a start count command 415 to the additional scanner nodes, including first scanner node 305. First scanner node: 305 can run a check against memory step 410 to determine if the first scanner node 305 has already received the start count command 415 from a user smart device 380, a server node 330, or a scanner node 310, 315. If the first scanner node 305 determines it already has a stored or recorded a start count command 415 for the set scan the first scanner node 305 can run a ignore duplicate step 450 to remove and/or not follow the duplicative command.

Second scanner node 310 can run a hardware device count step 430 and send a stored hardware device count data transmissions 425 to the additional scanner nodes in the autonomous human traffic monitoring system 300, such as first scanner node 305. After first scanner node 305 receives the stored hardware device count data transmission 425 from the second scanner node 310, the first scanner node 305 can run a check against memory step 410 to determine if the first scanner node 305 has already received the stored hardware device count data transmission 425 from the second scanner node 310. If the data transmission is determined to be new, first scanner node 305 runs a store in memory step 420 to record the data transmission from the second scanner node 310. If the stored hardware device count data transmission 425 is duplicative, the first scanner node 305 can run a ignore duplicate step 450 to remove and/or not follow the duplicative command (not shown in FIG. 5).

After receiving a new stored hardware device count data transmission 425, first scanner node 305 conducts a store hardware device count in memory step 440 for the data associated with the hardware device count for second scanner node 310. The store hardware device count in memory step 440 records the information associated with the unique hardware addresses found by the second scanner node 310 on a memory device associated with the first scanner node 305. The transmission of the hardware device count from scanner node to scanner node ensures that all scanner nodes within the autonomous human traffic monitoring system 300 have a complete set of data for the set scan. It also ensures that nodes that are outside the range of a primary node (the node connected directly with the server node or user smart device 380, here scanner node 305) can transmit their data to the primary node via the secondary nodes.

First scanner node 305 can send repeated start count commands 415 to the additional scanner nodes, including second scanner node 310.

Smart user device 380 can send a final count command 455 to the scanner nodes 305, 310, 315, or only to the primary scanner node, for example first scanner node 305. The final count command 455 can be sent via Wi-Fi as an HTTP GET request, via LoRa, or other suitable electronic data transmission. The final count command 455 requests the scanner nodes to end the set scan and transmit a final count of the unique hardware addresses to allow the user smart device 380 (or server node 330) to prepare a final count of unique hardware addresses for the set scan. The response to the final count command 455 from the scanner nodes, or just the primary scanner node, is a final count data transmission 465 from primary or first scanner node 305, and/or similar final count data transmissions 465 from the additional scanner nodes, 310, 315. The primary scanner node, such as the first scanner node 305 can send the information from the individual scanner nodes to the user smart device 380. Alternatively, the individual scanner nodes can send individual information directly to the user smart device 380. This final count information allows the user smart device 380 and/or the server node 330 to prepare a final count of the unique hardware addresses within the given area or building during a set scan. A processing device processes the data on a memory device associated with the server node to prepare the final count. The final count is then made available to the user 370 via the user interface on the user mobile device 380 (see FIGS. 1 and 2).

The area and/or building size that the autonomous human traffic monitoring system 300 can cover will vary depending on the number of scanner nodes 305, 310, 315 employed in the autonomous human traffic monitoring system 300. While there may be a maximum range for the LoRa transmissions, repeater nodes and/or multiple server nodes that connect to a central server node via wireless transmission or hard line can be configured to increase the coverage size.

The system 100 can further be configured to account for persons within the coverage area, such as a building or location to be monitored, that do not have smart devices. Modern estimates suggest that between 80-90%, and often above 95% of the population over the age of 12 carries a Wi-Fi enabled smart device. The software modules of the system 100 can be configured to compensate for approximately 10-20%, 5-15%, 1-10%, or other percentages of a given population that may not be in possession of a Wi-Fi enabled smart device. The software modules of the system 100 can approximate a final based on demographic data of smart device usage for a given area, village, town, state, locality, country, or a pre-defined local area. The coverage area can include, but is not limited to, a building, a group of buildings, a store, a group of stores, a mall, an arena, a concert venue, an outdoor park, a bridge, a tunnel, other public infrastructure, school campus, factory, warehouse, office, office building, apartment building, and/or a public or private areas. The coverage area can be between 100 square feet and 1,000,000 square feet, preferably between 100 square feet and 100,000 square feet, and most preferably between 1,000 square feet and 10,000 square feet. Variations on the coverage area can be increased and decreased based on user preference, the needs of the user or coverage area, and based on the required equipment, such as number of scanner nodes and number of server nodes.

The system 100 can further be configured to account for Wi-Fi data transmissions, such as Wi-Fi probe packets, that are recorded by the scanner nodes, but are in the possession of individuals that do not actually enter the coverage area. Examples, include persons that quickly enter and then exit a coverage area, such as going in and out of door in seconds, persons that pass by the coverage area but close enough to have their Wi-Fi hardware address recorded by the scanner nodes, and persons carrying more than one Wi-Fi enabled device. These considerations can be configured into the software modules that run the system 100 such as the accumulator software module.

Embodiment of the system 100 can be configured to only record and/or register Wi-Fi enabled smart devices within the coverage area. This can be accomplished by the positing of the scanner nodes as well as positioning the direction in which the scanner nodes scan a set portion of the coverage area. Additionally, the software modules can be further configured to account for persons that only pass or skim the coverage area by measuring a distance between the scanner and the location of the Wi-Fi enabled smart device.

Different Wi-Fi enabled smart devices transmit Wi-Fi probe packets at different rates. The software modules of the system 100 can be configured to account for different transmission rates when processing data related to the time spent by an individual person in a coverage area or portion of coverage area.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e., methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description is intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively-inclusive elements includes at least one element of the listed elements. However, an example described using a list of alternatively-inclusive elements does not preclude another example that includes all of the listed elements. And, an example described using a list of alternatively-inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

The invention claimed is:

1. A method comprising:
   initiating a start count command via a user interface n a user device;
   sending the start count command from a first processing device of a server node to a second processing device of a first scanner node via long-range low-power wide area network connection operating via a first network interface, a command including a first set of metadata and content, wherein:
     the server node comprises a first microcontroller which further comprises the first processing device and a first memory device;
     the first scanner node comprises a second microcontroller which further comprises the second processing device and a second memory device;
   storing, using the second processing device, the metadata of the start count command on the second memory device of the first node;
   determining, using the second processing device, whether the metadata of the start count command matches stored metadata on the second memory device;
   queueing, using the second processing device, the start count command stored on the second memory device; and
   sending the start count command from the second processing device of the first server node to a third processing device of a second scanner node via long-range low-power wide area network connection operating via a second network interface, the start count command including a second set of metadata and content, wherein:
     the second scanner node comprises a third microcontroller which further comprises the third processing device and a third memory device;
   storing, using the third processing device, the metadata of the start count command on the third memory device of the second node;
   determining, using the third processing device, whether the metadata of the start count command matches stored metadata on the third memory device;
   queueing, using the third processing device, the start count command stored on the second memory device;
   sending the start count command from the third processing device of the second server node to a fourth processing device of a third scanner node via long-range low-power wide area network connection operating via a third network interface, the start count command including a third set of metadata and content, wherein:
     the third scanner node comprises a fourth microcontroller which further comprises the fourth processing device and a fourth memory device;
   storing, using the fourth processing device, the metadata of the start count command on the fourth memory device of the third node; and
   determining, using the fourth processing device, whether the metadata of the start count command matches stored metadata on the fourth memory device.

2. The method of claim 1, further comprising:
   counting hardware devices, via the second processing device, based on electronic transmissions of Wi-Fi enabled devices in a coverage area, wherein:
     the electronic transmissions are sent via processing devices from smart devices via a Wi-Fi network connection; and
     the electronic transmissions are received via the second processing device of the first scanner node; and
   storing the hardware device count on the second memory device of the first scanner node, the stored hardware device count including first set of metadata and content.

3. The method of claim 2, further comprising:
   sending the hardware device count from the second processing device of the first scanner node to a third processing device of the second scanner node via long-range low-power wide area network connection operating via a network interface, the hardware device count including a fourth set of metadata and content.

4. The method of claim 3, further comprising:
   determining, using the third processing device on the second scanner node, whether the metadata of the hardware device count matches stored metadata on the third memory device; and
   storing, via the third memory device on the second scanner node, the metadata of the hardware device count.

5. The method of claim 1, further comprising:
   checking a start count command via the second processing device and second memory device on the first scanner node, and running an ignore duplicate module on the second processing device; and
   ignoring a second start count command when the start count command is stored on the second memory device.

6. The method of claim 4,
   sending, via the first processing device, a final count command from the user device, via Wi-Fi network;
   receiving, via the second processing device on the first scanner node, the final count command; and sending, via the second processing device on the first scanner node, the hardware device count to the first processing device via long-range low-power wide area network connection operating via a network interface, the hardware device count including the fourth set of metadata and content.

7. The method of claim 6, further comprising:
processing, via the first processing device, the hardware device count metadata received from the first scanner node;
determining, via the first processing device, a total number of persons in a coverage area based on the metadata in the hardware device count; and
sending data on the total number of persons in the coverage area to a user interface on user device.

8. The method of claim 6, further comprising:
repeatedly sending, via the first processing device, the final count command to the second processing device of the first server node until the second processing device of the first scanner node sends the hardware device count to the first processing device.

9. A system comprising:
a server node configured to receive data including a first set of metadata and content via a first processing device from a first scanner node via a second processing device on the first scanner node, wherein the server node comprises a first memory device and a software module;
the first scanner node further comprising a second memory device and the software module; wherein the second processing device is configured to check a first set of commands and data transmissions against data including a second set of metadata and content stored in the second memory device;
a second scanner node comprising a third processing device, a third memory device, and the software module; wherein the third processing device is configured to check a second set of commands and data transmissions against data including a third set of metadata and content stored in the third memory device;
a third scanner node comprising a fourth processing device, a fourth memory device, and the software module; wherein the fourth processing device is configured to check commands and data transmissions against data including a fourth set of metadata and content stored in the fourth memory device; and
a user device comprising the software module, a user processing device, a user interface, and a user memory device; wherein the user processing device is configured to process data including a fifth set of metadata and content received via the user processing device from the second processing device of the first scanner node.

10. The system of claim 9, wherein the server node comprises:
a first software module configured to send and receive data via Wi-R network connection from the first processing device; and
a second software module configured to send and receive data via long-range low-power wide area network connection from the second processing device.

11. The system of claim 9, wherein the first scanner node comprises:
a first software module configured to send and receive data via Wi-Fi network connection from the third processing device; and
a second software module configured to send and receive data via long-range low-power wide area network connection from the second processing device.

12. The system of claim 9, wherein:
the second processing device on the first scanner node receives electronic transmissions from smart devices;
the electronic transmissions comprise data including hardware device with a fifth set of metadata and content; and
the second processing device processes the hardware device metadata and content to prepare a hardware device count.

13. The system of claim 12, wherein:
the first scanner node sends the hardware device count via the second processing device to the first processing device on the server node;
the first processing device sends the hardware device count to ti device; and
the user processing device processes the hardware device count and displays the processed data on the user interface.

14. The system of claim 12, wherein:
the software module on the first scanner node is configured to process the hardware device count data and determine if the hardware device count data is stored on the second memory device of the first scanner node; and
the second processing device is configured to ignore the hardware device count data when it has already been stored on the second memory device.

15. A method, comprising:
receiving, at a processing device of a microcontroller, from a user smart device via a long-range low-power wide area network connection operating via a network interface, a first command including metadata and content; and
upon determining the first command matches a second command on a memory device, sending, using the processing device, the command to a second microcontroller via the long-range low-power wide area network connection, wherein the user smart device is a smartphone having a graphical user interface.

16. The method of claim 15, further comprising:
sending, via the processing device, a final count command from the user device to a first microcontroller and a second microcontroller;
receiving a hardware device count, at the user device, from the first microcontroller and the second microcontroller; and
processing the hardware device count, via the processing device, and sending the hardware device count to the graphical user interface.

17. The method of claim 15, wherein the user device comprises a software module configured to approximate a final count based on demographic data of smart device usage for a local area.

18. The method of claim 15, comprising a coverage area, wherein the coverage area comprises a building, a store, an arena, a concert venue, an outdoor park, or a public square, and wherein the coverage area is between 1,000 square feet and 10,000 square.

19. The method of claim 15, further comprising, storing, using the processing device, the first command in the memory device for comparing the second command to the first command.

20. The method of claim 15, wherein the microcontroller is configured to be powered via battery, solar power, wind power or hard wired to an electric system, powered via power over ethernet.

* * * * *